(12) United States Patent
Kim

(10) Patent No.: US 10,925,696 B2
(45) Date of Patent: Feb. 23, 2021

(54) IMPLANT UNIT

(71) Applicant: Kwang Seob Kim, Fullerton, CA (US)

(72) Inventor: Kwang Seob Kim, Fullerton, CA (US)

(*) Notice: Subject to any disclaimer, the term of this patent is extended or adjusted under 35 U.S.C. 154(b) by 77 days.

(21) Appl. No.: 16/335,363

(22) PCT Filed: Jul. 28, 2017

(86) PCT No.: PCT/KR2017/008157
§ 371 (c)(1),
(2) Date: Mar. 21, 2019

(87) PCT Pub. No.: WO2018/056566
PCT Pub. Date: Mar. 29, 2018

(65) Prior Publication Data
US 2019/0216579 A1    Jul. 18, 2019

(30) Foreign Application Priority Data

Sep. 23, 2016   (KR) .................. 10-2016-0122042

(51) Int. Cl.
*A61C 8/00* (2006.01)
(52) U.S. Cl.
CPC .......... *A61C 8/0068* (2013.01); *A61C 8/0027* (2013.01); *A61C 8/0031* (2013.01); *A61C 8/0066* (2013.01); *A61C 8/0077* (2013.01)
(58) Field of Classification Search
CPC ... A61C 8/0018; A61C 8/0019; A61C 8/0027; A61C 8/003; A61C 8/0031
See application file for complete search history.

(56) References Cited

U.S. PATENT DOCUMENTS

| | | | | |
|---|---|---|---|---|
| 3,579,829 A | * | 5/1971 | Sampson | A61C 8/0089 433/158 |
| 3,919,772 A | * | 11/1975 | Lenczycki | A61C 1/084 433/173 |
| 3,925,892 A | * | 12/1975 | Juillet | A61C 8/001 433/176 |
| 4,722,687 A | * | 2/1988 | Scortecci | A61C 8/0018 433/165 |
| 5,601,553 A | * | 2/1997 | Trebing | A61B 17/15 411/399 |

(Continued)

FOREIGN PATENT DOCUMENTS

| | | |
|---|---|---|
| JP | 07-213540 | 8/1995 |
| KR | 10-2009-002818 | 3/2009 |

(Continued)

OTHER PUBLICATIONS

International Search Report dated Nov. 3, 2017 for PCT/KR2017/008157.

*Primary Examiner* — Ralph A Lewis

(57) ABSTRACT

The present invention relates to an implant unit comprising: an artificial dental root including a plate portion having a first side surface and a second side surface extending along the horizontal extending direction of the alveolar bone and opposed to each other, and a base portion protruding from the first side surface at the upper end of the plate portion, penetrating through a surface of the alveolar bone, and being implanted into the alveolar bone; and at least more than one abutment formed on the upper end of the base portion.

21 Claims, 8 Drawing Sheets

(56) References Cited

U.S. PATENT DOCUMENTS

| | | | | |
|---|---|---|---|---|
| 5,906,489 | A * | 5/1999 | Khazzam | A61C 8/0022 433/173 |
| 6,402,516 | B2 * | 6/2002 | Ihde | A61C 8/001 433/176 |
| 8,118,597 | B2 * | 2/2012 | Misch | A61C 8/001 433/176 |
| 8,277,220 | B2 * | 10/2012 | Spahn | A61L 27/50 433/176 |
| 2010/0112522 | A1 * | 5/2010 | Kwon | A61C 8/0031 433/174 |
| 2013/0149668 | A1 * | 6/2013 | Chen | A61C 8/0022 433/174 |
| 2016/0022385 | A1 * | 1/2016 | Zhao | A61C 13/0004 433/173 |
| 2018/0161129 | A1 * | 6/2018 | Mommaerts | A61C 8/0031 |

FOREIGN PATENT DOCUMENTS

| KR | 10-2009-0107508 | 10/2009 |
|---|---|---|
| KR | 10-2011-0074325 | 6/2011 |
| KR | 10-2015-0040777 | 4/2015 |

* cited by examiner

IMPLANT UNIT

This application claims the priority of Korean Patent Application No. 10-2016-0122042, filed on Sep. 23, 2016 in the KIPO (Korean Intellectual Property Office), the disclosure of which is incorporated herein entirely by reference. Further, this application is the National Stage application of International Application No. PCT/KR2017/008157, filed Jul. 28, 2017, which designates the United States and was published in Korean. Each of these applications is hereby incorporated by reference in their entirety into the present application.

TECHNICAL FIELD

The present invention relates to an implant unit, and more particularly, to a dental implant unit.

BACKGROUND ART

Artificial teeth are artificially manufactured teeth so that they may be almost identical to human natural teeth in terms of shape and function. The artificial teeth are used as a substitute for replacing a natural tooth when natural teeth are missing due to various factors such as tooth cavity.

There are generally three approaches such as bridges, dentures or implantation into alveolar bone when replacing natural teeth with artificial teeth according to the symptoms and prognosis of the dental disease. In the case of the bridge, there are problems that since healthy adjacent teeth must be cut, the natural teeth are damaged, the masticatory force is weakened because there is no tooth root, and the life span is not as long as ten years. In the case of the dentures, there is a problem that natural teeth are damaged, the alveolar bone is gradually absorbed in the use process, and it is separated from the oral cavity during use, or an inconvenient is generated that it gives a foreign body feeling to the user. Therefore, application of the bridge and the denture are being reduced bit by bit as long as the alveolar bone is strong.

On the other hand, according to the implant method of implanting an artificial tooth into an alveolar bone, an independent operation may be possible without damaging adjacent natural teeth as long as the alveolar bone is maintained in a state suitable for treatment, and appearance and function of the implanted teeth are excellent to the extent that it is difficult to distinguish it from natural teeth after implantation. Therefore, its application is expanding rapidly. In addition, the applied implant unit is preferable because its service life is semi-permanent depending on the management state.

In the case of the implant unit, when the regular or irregular load is repeated in the oral cavity due to actions such as chewing of food or gritting one's teeth, the alveolar bone implanted with the implant unit is destroyed or the alveolar bone is absorbed by the continuous stress concentration, and there is a case that may cause additional pathologies or cause a decrease in the life of the implant unit.

In addition, there is a problem that the it is difficult or impossible to perform operation or re-operation by using an existing implant unit when the alveolar bone is inherently short or very thin; the alveolar bone is excessively absorbed due to the use of the provided implant unit or aging; the alveolar bone is damaged because tooth is removed and is neglected without any cares for a long time; or the alveolar bone is severely damaged due to serious gum disease.

DISCLOSURE OF THE INVENTION

Technical Problem

A problem to be solved by the present invention is to alleviate or suppress the occurrence of the phenomenon of alveolar bone absorption or additional pathology generated in a conventional implant unit which is inserted perpendicularly into the alveolar bone. Thus, it is an object of the present invention to provide an implant unit which has an extended service life, and is easily applicable to alveolar bone having a shape, size or symptom unsuitable for implant treatment.

Technical Solution

According to an embodiment of the present invention, there is provided an implant unit comprising a fixing portion including a plate portion having a first side surface and a second side surface extending along the horizontal extending direction of the alveolar bone and opposed to each other, and a base portion protruding from the first side surface at the upper end of the plate portion, penetrating through the surface of the alveolar bone and being implanted into the alveolar bone; and at least more than one abutment formed on the upper end of the base portion.

At least a portion of the first side surface of the plate portion may be coupled to the alveolar bone, and at least a portion of the second side surface may be exposed to the outside. At least a portion of the exposed second side surface may be covered by the gingiva. The average length L of the first side surface and the second side surface of the plate portion and the thickness W of the plate may satisfy $0.2 \leq L/W \leq 100$.

The implant unit of the present invention may be provided wherein the plate portion may include at least more than one engagement hole passing through the first side surface and the second side surface; and the alveolar bone is coupled to an engagement unit (screw, bolts/nuts) for engaging the fixing portion through the at least more than one engagement hole. The at least more than one engagement hole may have a downwardly inclined inner circumferential surface. The engagement unit is a screw. The screw has a main body portion having a first screw thread of a first pitch; and a head portion having a second screw thread having a second pitch different from the first pitch and connected to the first screw thread. The second pitch may be smaller than the first pitch.

The plate portion may include at least more than one opening penetrating through the first side surface and the second side surface to expose the internal tissue of the alveolar bone. The aperture ratio of the at least more than one opening may be in a range of 5% to 95%.

The base portion may protrude from the first side surface of the plate portion and be inclined downward into the alveolar bone. The base portion may have a rectangular structure, a triangular structure, a circular structure, a wedge structure, or a composite structure thereof.

The at least more than one abutment may be integrally formed with the securing portion. The at least more than one abutment may be engaged with the upper end of the fixing portion. A stress dispersion member protruding from the first side surface of the plate portion, passing through the surface of the alveolar bone, being inclined downward into the alveolar bone, and being implanted may be further included.

The stress dispersion member may be disposed at an upper end portion, a lower end portion, or an area between the upper end and the lower end portion of the plate portion.

The stress dispersion member may be integrally formed with the plate portion. The stress dispersion member may be engaged with the plate portion through the first side surface and the second side surface of the plate portion. The stress dispersion member may have a square structure, a triangular structure, a circular structure, a wedge structure, or a composite structure thereof.

Advantageous Effects

According to an embodiment of the present invention, there is provided an implant unit comprising a fixing portion comprising a plate portion having a first side surface and a second side surface extending along the horizontal extending direction of the alveolar bone and opposed to each other, and a base portion protruding from the first side surface at an upper end of the plate portion, penetrating through the surface of the alveolar bone and being implanted into the alveolar bone; and at least more than one abutment formed on the upper end of the base portion. Therefore, the implant unit may be provided even when the alveolar bone is thin or short as compared with the conventional vertical penetrating implant unit, when the alveolar bone is excessively absorbed, and when the alveolar bone is damaged. In addition, the stress transmitted to the alveolar bone caused by the chewing action is dispersed due to the base portion protruding from the plate portion and implanted into the alveolar bone, thereby reducing the fatigue of the alveolar bone and preventing damage to the alveolar bone. As a result of the dispersion of the stress, the implant unit in which fatigue received by the alveolar bone is reduced and a life span of the implant unit is prolonged may be provided.

BEST MODE FOR CARRYING OUT THE INVENTION

Figure 1A:
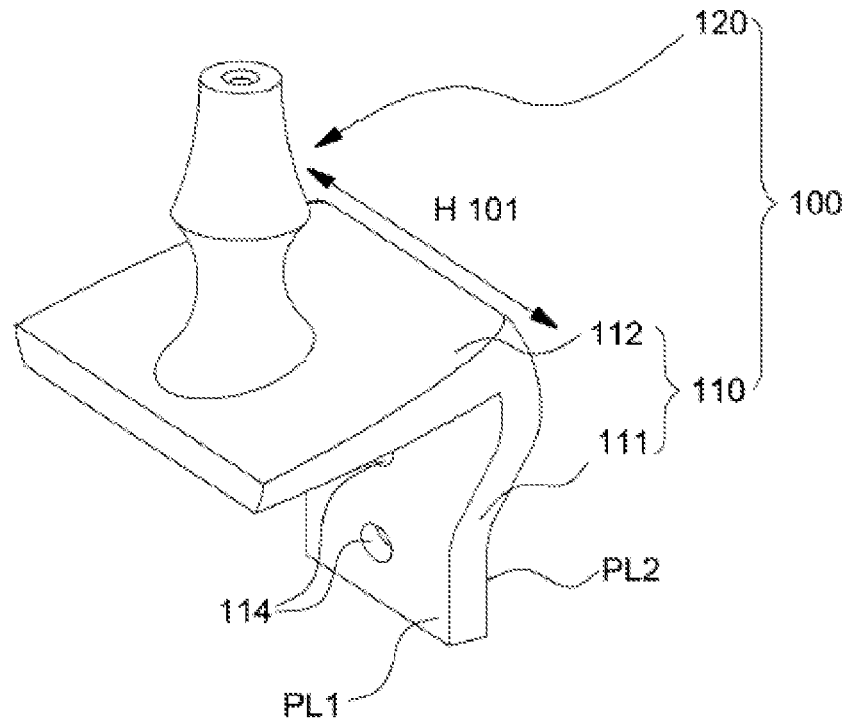
FIG. 1A and FIG. 1B are perspective views illustrating an implant unit 100 according to an embodiment of the present invention at different points in time.

Hereinafter, preferred embodiments of the present invention will be described in detail with reference to the accompanying drawings.

The embodiments of the present invention are provided in order to more fully explain the present invention to those skilled in the art having a common knowledge, and the following embodiments may be modified into various other forms. The scope of the present invention is not limited to the embodiment. Rather, these embodiments are provided so that this disclosure may be described more faithfully and completely, and the scope of the invention may be fully conveyed to those skilled in the art.

Further, in the following drawings, thickness and size of each layer are exaggerated for convenience and clarity of description, and the same reference numerals denote the same elements in the drawings. As used herein, the term "and/or" includes any one and all combinations of one or more of the listed items.

The terminology used herein is for the purpose of describing particular embodiments only and is not intended to be limiting of the invention. As used herein, the singular form may include a plural form unless the context clearly dictates otherwise. Also, the terminology, "comprise" and/or "comprising" when used in this specification are taken to specify the presence of stated features, steps, numbers, operations, elements, elements and/or existence of this group, and do not preclude the presence or addition of one or more other features, steps, numbers, operations, elements, elements, and/or existence or addition of this group.

Further, the term "connection" as used herein means not only that some members are directly connected, but also that other members are interposed between the members to indirectly connect them.

Figure 1B:
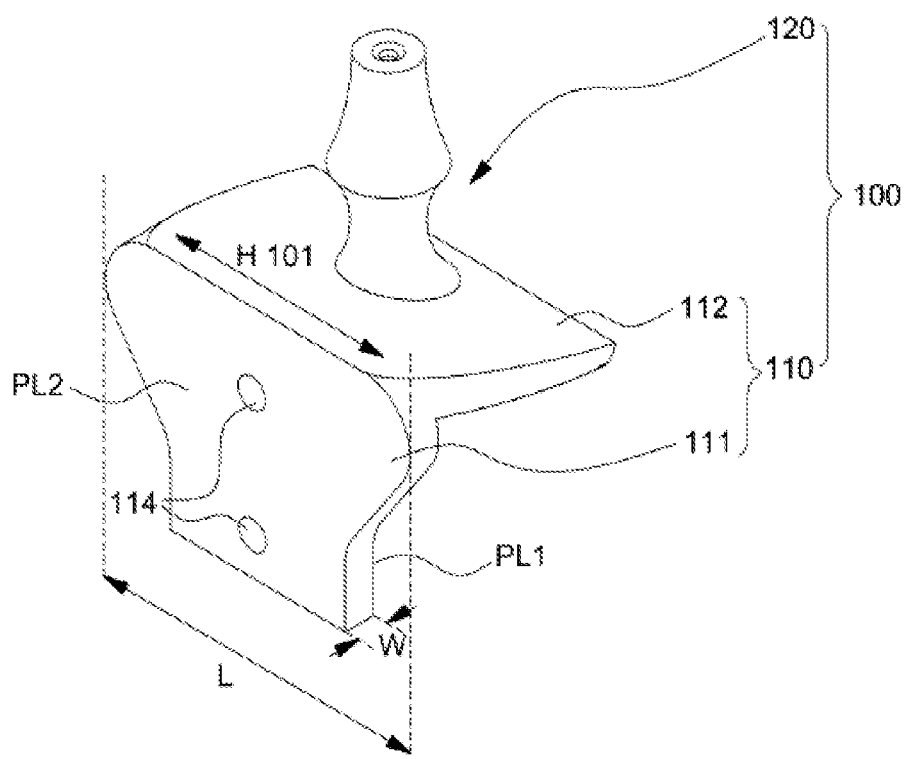
Figure 1C:
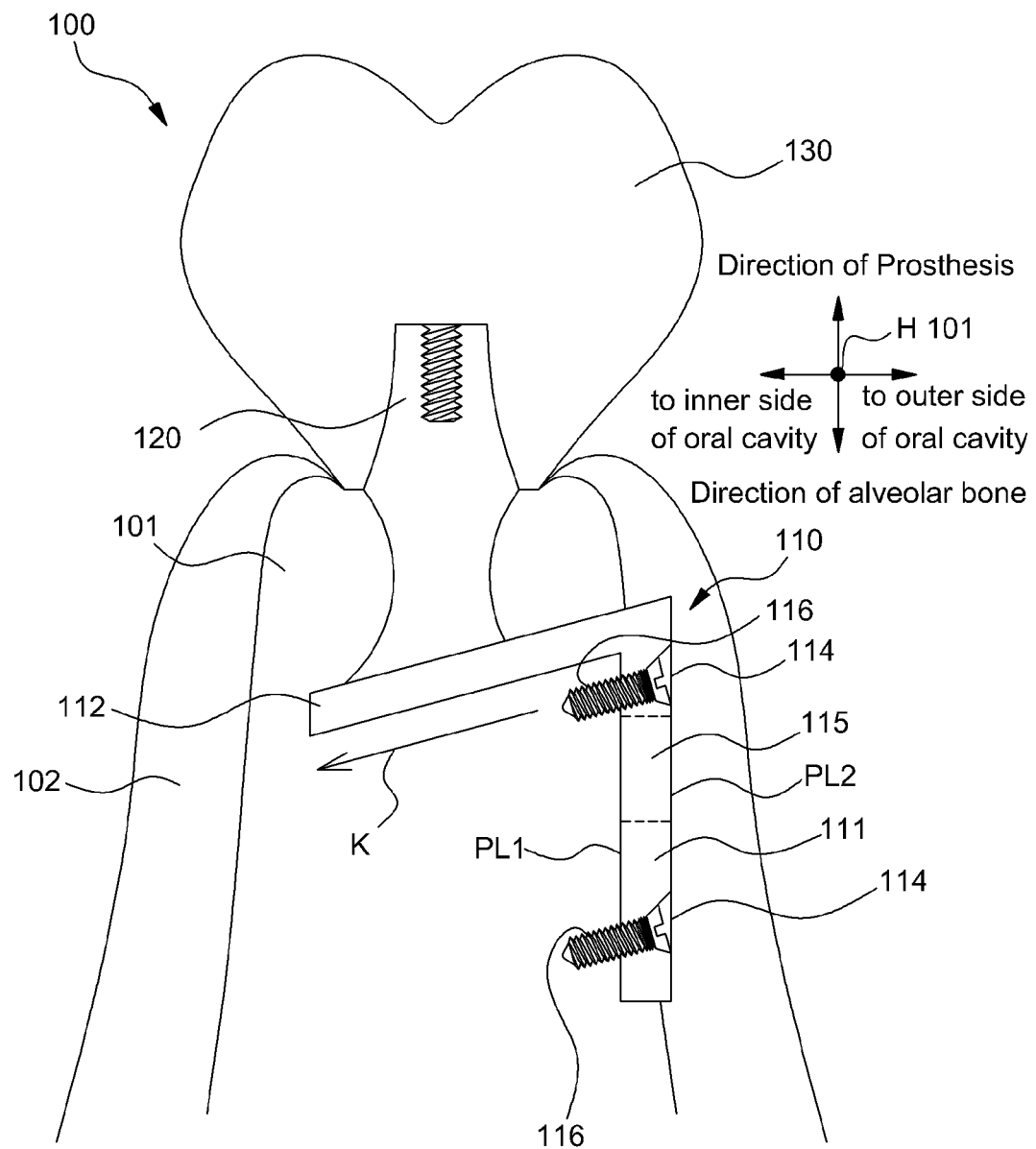
FIG. 1C is a cross-sectional view showing a post-operation state in which the implant unit 100 is coupled to the alveolar bone 101.

FIG. 1A and FIG. 1B are perspective views illustrating an implant unit 100 according to an embodiment of the present invention at different points in time; and FIG. 1C is a vertical cross-sectional view showing a post-operation state in which the implant unit 100 is coupled to the alveolar bone 101.

Referring to FIG. 1A to FIG. 1C, the implant unit 100 may include a fixing portion 110 being fixedly supported on the alveolar bone 101 and an abutment 120 for engagement a prosthesis 130. The fixing portion 110 may include a base portion 112 for supporting a plate portion 111 the abutment 120.

The plate portion 111 may include a first side surface PL1 and a second side surface PL2 that extend along the horizontal extending direction H101 of the alveolar bone 101 and are opposed to each other. The first side surface PL1 of the plate portion 111 is a surface facing the inside of the oral cavity as shown by the coordinate system of FIG. 1C, and the second side surface PL2 is a surface facing the outside of the oral cavity. The plate portion 111 may be coupled to the alveolar bone 101 in such a manner that the first side surface PL1 of the plate portion 111 may be padded to the outer surface of an oral cavity of the alveolar bone.

In one embodiment, the first side surface PL1 of the plate portion 111 may be joined using a binder suitable for the alveolar bone 101. The binder may be a binder having biocompatibility known in the art. In another embodiment, the plate portion 111 may be engaged with the alveolar bone 101 using the screws 116. In this case, in the plate portion 111, at least one engagement hole 114 through which the screw 116 passes may be formed. The explanation concerning this structure will be separately described later. The second side surface PL2 of the plate portion 111 may be embedded with the gingiva 102.

In consideration of a lateral side of the alveolar bone 101 to which the first side surface PL1 of the plate portion 111 is padded, for example, shape, size, or curvature of the outer surface of an oral cavity of the alveolar bone 101, the plate portion 111 may have the form of a plate having a flat surface or a curved surface. In one embodiment, in terms of features, the plate portion 111 may have the shape of an inverted trapezoid with the upper portion wider than the lower portion, or vice versa. The shape shown in FIGS. 1A and 1B shows a plate shape having an inverted trapezoidal shape and a curved edge. However, the shape of the plate portion 111 as described above is merely exemplary and the present invention is not limited thereto. The shapes of the plate portion 111 may be various polygons such as a rectangle, an ellipse and a rhombus, an ellipse, or combined forms of the enumerated shapes.

The average length L of the plate portion 111 may be in the range of 2 mm to 20 mm. The average length L of the plate portion 111 is defined as the length of the alveolar bone 101 in the horizontal extending direction (a direction perpendicular to the paper surface as indicated by the black circle (●) in the coordinate system of FIG. 1C). The implant unit 100 according to the embodiment of the present invention does not secure the supporting force by placing the artificial root vertically in the alveolar bone 111, but the supporting force is secured when the plate portion 111 is engaged with the cortical bone which is to the outer surface of an oral cavity of the alveolar bone 111, for example, the hardest portion of the alveolar bone. Therefore, even if the average length L1 of the plate portion 111 is as small as 2 mm, the durability of the implant unit 100 may be secured from various stresses that may occur during use of the implant unit 100 after surgery. In one embodiment, the thickness W of the plate portion 111 may range from 0.2 mm to 6 mm, and preferably from 0.2 mm to 3 mm.

The plate portion 111 may be formed of a metal one such as titanium (Ti), tungsten (W), aluminum (Al), hafnium (Hf), niobium (Nb), tantalum (Ta), zirconium (Zr), platinum (Pt) or, one alloy of any one selected from the above metals. The metal materials are illustrative, and the present invention is not limited thereto, and other metals having no corrosion, suitable strength and biocompatibility may be applied. In another embodiment, the plate portion 111 may be formed of a ceramic artificial bone material which is not a metal, or a composite material of the aforementioned metal and a ceramic material.

In one embodiment, the plate portion 111 may be formed so that the coupling surface of the plate portion 111 may be closely contacted with the outer lateral surface of an oral cavity of the alveolar bone 101 by etching a predetermined depth of the outer lateral surface of an oral cavity. In this case, the cortical bone of the alveolar bone 101 may become thin or the cancellous bone in the cortical bone may be exposed. In this case, a calcium phosphate-based ceramic coating layer such as apatite hydroxide[$Ca_{10}(PO_4)_6(OH)_2$, HA] having excellent bioactivity may be further formed on the surface of the first side surface PL1 of the plate portion 111. As a result of it, the reactivity with the alveolar bone 101 is facilitated and thereby, the bond strength is enhanced. As another coupling force improving layer, a ceramic layer such as $TiO_2$, $Ta_2O_5$, $Nb_2O_5$, $ZrO_2$, $SiO_2$, $RuO_2$, $MoO_2$, $MoO_3$, $VO$, $VO_2$, $V_2O_3$, $V_2O_5$, $CrO_2$, or $CrO_3$ may be applied. These materials are exemplary, and any material capable of promoting osseointegration as a coating material may be applied.

The base portion 112 protrudes from the first side surface PL1 at the upper end of the plate portion 111 and may be inserted and embedded into the alveolar bone 101. Since the base portion 112 is inserted into the inside of the alveolar bone 101, it may contact the cancellous bone inside the alveolar bone 101. The base portion 112 may be integrated with the plate portion 111 and may be formed of the same material as the plate portion 111, or may include a material having biocompatibility or a material which may promote osseointegration in consideration of contact with cancellous bone as described above.

Since the base portion 112 is embedded in the alveolar bone 101 when the implant unit 100 according to the embodiment of the present invention is applied to the alveolar bone 101, a line-shaped groove extending in the horizontal extending direction H101 of the alveolar bone 101 is formed in the alveolar bone 101 from the outer lateral surface of an oral cavity of the alveolar bone 101 toward the oral cavity, and thereby, a space for inserting the base portion 112 may be ensured. Therefore, according to the embodiment, when the implant unit 100 is applied, the plate portion 111 is padded on a lateral side of the alveolar bone 101 and the base portion 112 is inserted into the space. As a result, the fixing portion 110 may be coupled to the alveolar bone 101.

The implant unit 100 according to the embodiment of the present invention ensures a strong supporting force by the plate portion 111 and at the same time the base portion 112 is inserted into the alveolar bone in the direction of the mouth to reinforce the supporting force of the implant unit 100. As a result, the implant unit 100 may be firmly implanted even when the alveolar bone is innately short or very thin; the alveolar bone is excessively absorbed due to the use of the already provided implant unit or aging of the unit; the alveolar bone is damaged after the teeth are removed and are neglected without caring them for a long time; or the alveolar bone is severely damaged after the teeth are extracted due to a gum disease.

The base portion 112 has a three-dimensional structure having a surface extending in a direction extending in the horizontal direction of the alveolar bone 101 and in a direction from the outside of the oral cavity of the alveolar bone to the inside of its. In one embodiment, the base portion 112 may extend horizontally into an inside direction of the oral cavity of the alveolar bone 101. In another embodiment, the base portion 112 may have an extended surface that is inclined downward at a predetermined angle to an inside direction of the oral cavity of the alveolar bone 101 and a dental root direction, as indicated by the arrow K in FIG. 1C.

In connection with the vertical stress in the direction of the dental root generated during use of the implant unit 100, such as a chewing action, by the three-dimensional structure having the area of the base portion 112, the vertical stress is dispersed by the contact surface into which the base portion 112 extends in the alveolar bone 101, and as a result of it, the fatigue degree of the alveolar bone portion of the base 112 may be reduced. Therefore, according to the embodiment of the present invention, damage and absorption of the alveolar bone due to fatigue deterioration may be prevented, the prognosis after implantation is improved, and the function of the implant unit 100 may be immediately available. Further, due to the stress dispersion, the fatigue of the implant unit 100 may be reduced, and the life span of the implant unit 100 may be prolonged.

In one embodiment, the base portion 112 may have a cross-section of a rectangular, triangular, circular, wedge, or a composite structure thereof. For example, the base portion 112 may have a three-dimensional structure plate having a wedge-like structure. Along the cross-section of the base portion 112, a groove is formed in the base portion 112 so that the base portion 112 may be inserted inwardly from the outer surface of the oral cavity of the alveolar bone 101. The enumeration of the shape of the base portion 112 is illustrative, and the present invention is not limited thereto.

At least more than one abutment 120 may be disposed on the upper end of the base portion 112 for coupling external elements such as the prosthesis 130. The abutment 120 may have various shapes without being limited to the shape of its in consideration of the coupling method with the fixing part 110 and the shape of the prosthesis 130. In one embodiment, the abutment 120 may be integrally formed with the base portion 112. In this case, the abutment is projected from the upper end of the base portion 112 toward the prosthesis. Therefore, when the base portion 112 is inserted into the groove formed in the alveolar bone 101, as for the groove into which the base portion 112 is to be inserted so as to be inserted together with the base portion 112, it is necessary to form it as an additional groove opened in the direction of the prosthesis, that is, the upper direction of the alveolar bone 101. In this case, the groove into which the base portion 112 and the abutment 120 are inserted into the alveolar bone 101 may have a shape such as '⊥'. In one embodiment, if there is a clearance between the groove, the base and the abutment, a suitable filler such as a small amount of bone and/or bone formation promoter may be used to fill the clearance.

In another embodiment, the abutment 120 is independent of the base portion 112 and may have a configuration that may be engaged with each other during surgery. This may be explained in conjunction with FIG. 3F, which will be described later. The above abutment matters regarding the abutment 120 are merely illustrative and the present invention is not limited thereto.

According to the embodiment of the present invention, the implant unit 100 is supported in such a manner that primarily the plated portion 111 is padded to the outer surface of the oral cavity by using the outer surface of the oral cavity of the alveolar bone, for example, the strongest cortical bone. Thus, strong supporting force may be secured even with the alveolar bone having weak or thin strengths. Further, secondarily, the base portion 112 supports the implant unit 100 in the alveolar bone 101 in an auxiliary manner and thus, it is possible to secure an improved supporting force, as compared with the conventional implant unit vertically embedded in the alveolar bone.

In addition, in case of the conventional implant unit vertically embedded in the alveolar bone, a weak portion of the alveolar bone is implanted in the cancellous bone, and the bonding time between the implant unit and the alveolar bone was required. However, according to the present invention, since the implant unit 100 is coupled to the rigid cortical bone of the alveolar bone, the time required for the implant unit 100 to be coupled with the alveolar bone 101 is reduced, thereby providing an advantage that necessary functions may be performed immediately after the operation.

Further, according to the embodiment of the present invention, since the base portion 112 may disperse various stresses transmitted from the abutment 120 to the alveolar bone 101, the life span of the implant unit 100 and the prognosis of the patient may be improved.

Figure 2:
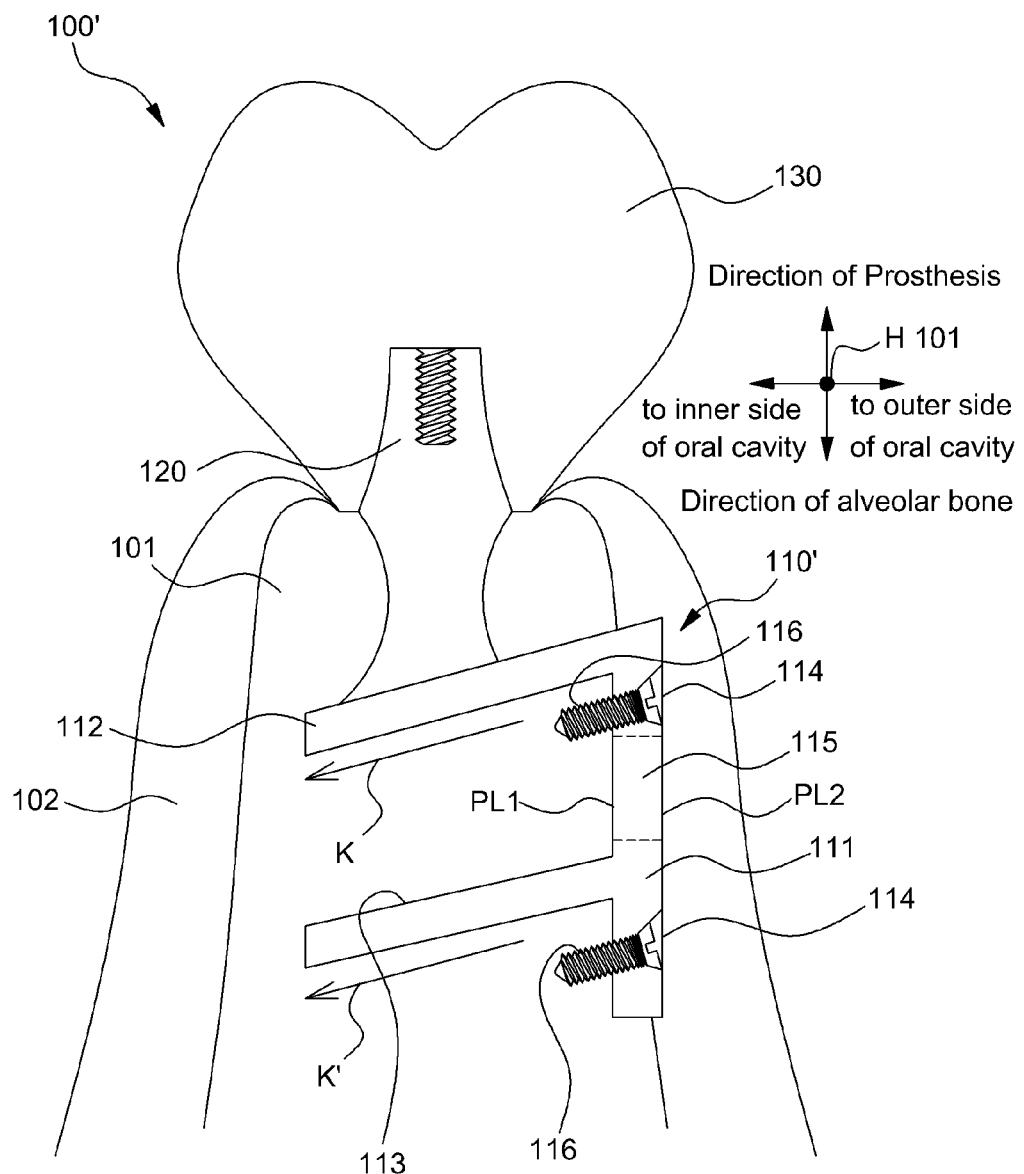
FIG. 2 is a cross-sectional view showing a post-operation state in which an implant unit according to an embodiment of the present invention is coupled to an alveolar bone.

FIG. 2 is a cross-sectional view illustrating an implant unit 100' according to another embodiment of the present invention.

Referring to FIG. 2, the implant unit 100' may include a plate portion 111 which is coupled to the alveolar bone 101 and is embedded in the gingiva 102; a fixing portion 110 including a base portion 112 which protrudes from the upper portion of the plate portion 111, and is inserted into the alveolar bone 101; and an abutment 120 coupled to an upper end of the base portion 112 of the fixing portion 110.

At least a portion of the first side major face PL1 of the plate portion 111 may be contacted or embedded on the lateral side of the alveolar bone 101, and at least a portion of the second side major face PL2 may be exposed to the outside. Also, the exposed part of the second side surface PL2 may be covered by the gingiva.

The plate portion 111 is capable of performing a function of reinforcing the alveolar bone 101 by contacting or being embedded into the lateral side of the alveolar bone 101 as described above. In one embodiment, the thin alveolar bone may be provided with a plate portion 111 including a material stronger than the alveolar bone in order to reinforce a thin alveolar bone having a weak strength. In addition, since the implant unit 100' including the plate portion 111 may minimize damage of the alveolar bone 101, the prognosis of surgery may be improved as compared with the conventional implant unit in which the alveolar bone is vertically penetrated. In addition, the plate portion 111 follows the features of the plate portion described above in FIG. 1A to 1C.

The plate portion 111 may include one or more engagement holes 114. The engagement hole 114 penetrates through the first side surface PL1 and the second side surface PL2 of the plate portion 111 and the engagement unit 116 such as a screw may fasten the fixing portion 110 and the alveolar bone 101 through the engagement hole 114. In one embodiment, the engagement unit 116 may be a screw, nail, pin, or bolt/nut. Details of the engagement hole 114 and the engagement unit 116 will be described later with reference to FIGS. 4A to 4B.

The plate portion 111 may have at least more than one opening 115 penetrating the first side surface PL1 and the second side surface PL2 so as to expose the internal structure. According to one embodiment, the opening 115 may serve to keep the surface (cortical bone) of the remaining alveolar bone 101 from being damaged. Further, the gingiva 102 and the alveolar bone 101 may be directly brought into contact with each other through the opening 115, so that the formation of the periodontal cyst may be suppressed.

Further, flow of blood may be smooth through the opening 115. In one embodiment, the opening 115 may be used as a delivery passage for a nutrient, or an effective material such as a drug. The effective material may be easily and effectively transmitted between the alveolar bone 101 and the gingiva 102 through the opening 115 to improve the engraftment rate of the implant unit after embedding the implant unit.

The shape of the opening 115 is also described in FIGS. 3A and 3B to be described later, but may be any curved shape such as a circle, an ellipse, a peanut shape, an arbitrary polygon such as a triangle, a rectangle, a pentagon or a hexagon, or a complex form thereof. The above description is only illustrative and the present invention is not limited thereto. The opening 115 may also be referred to interchangeably by using the terms such as windows or slits.

The opening 115 may have an aperture ratio in the range of 5% to 95% of the area of the plate portion 111. If the opening ratio of the opening 115 is less than 5%, the circulation effect of blood and nutrients through the opening 115 may be insignificant. Further, when the aperture ratio exceeds 95%, the porosity of the entire implant unit is increased and thereby, the strength of the implant unit may be weakened and support of the implant unit 100' may become difficult. The opening 115 is not limited in shape and size in order to perform the functions described above, and the above description is only illustrative and the present invention is not limited thereto.

The base portion 112 may disperse the stress received by the alveolar bone 101 and may reduce the fatigue of the alveolar bone 101. Therefore, the life span of the implant unit 100' may be further improved, and absorption or damage of cancellous bone in the alveolar bone 101 due to stress during use may be prevented.

In one embodiment, the base portion 112 may protrude from the plate portion 111 at a predetermined angle. In one embodiment, it may be inclined downward into the alveolar bone 101 and implanted in the alveolar bone 101, as shown by the arrow K. Because of the inclined downward structure, a more extended area between the alveolar bone 101 and the base part 112 may be ensured with respect to the width of the same alveolar bone, so that the binding force between the alveolar bone 110 and the alveolar bone 101 may be increased. As a result, even when the alveolar bone 101 is thin, it is possible to stably support the implant unit 100' by securing a wide coupling area. Therefore, even in case of a patient wherein the alveolar bone 101 is thin and the conventional implant may not be applied, the implant unit 100' according to the embodiment of the present invention may be practiced.

Further, since the inclined downward structure of the base portion 112 allows the implant unit 100' to be further implanted in the direction of the alveolar bone when stress in the up-and-down direction such as a chewing action occurs, the engagement force between the alveolar bone 101 and the implant unit 100' may be further improved. In addition, the base portion 112 may have the features of the base portion described above with reference to FIG. 1A to 1C if there are no discrepancies.

The abutment 120 may be disposed at the upper end of the base portion 112 to connect the prosthesis 130 and the fixing portion 110. According to one embodiment, the abutment 120 may have an uneven pattern on the top and/or bottom thereof, and the uneven pattern may improve the binding force with the artificial tooth or prosthesis 130. The abutment 120 may have various shapes without limitation in consideration of the degree of engagement with the fixing portion 110 and the shape of the prosthesis 130. In addition, the abutment 120 follows the abutment feature described above with reference to FIG. 1A-1C.

In one embodiment, the implant unit 100' may further include a stress dispersion member 113 in the plate portion 111. The stress dispersion member 113 may protrude from the first side surface PL1 of the plate portion 111 and be implanted into the alveolar bone 101 from the surface of the alveolar bone 101.

The stress dispersion member 113 may be selectively included into the implant unit 100' when the stress dispersion of the alveolar bone is insufficient only by the base portion 112 or when the coupling force between the implant unit 100' and the alveolar bone 101 is weak. The stress dispersion member 113 is also engaged with the inside of the alveolar bone 101 so that the alveolar bone 101 and thus, the implant unit 100' may secure a stronger holding force and supporting force.

The stress dispersion member 113 may have a three-dimensional shape having an extended contact area with the inner tissue of the alveolar bone 101, similar to the base portion 112. The three-dimensional structure of the stress dispersion member 113 may disperse the stress of the vertical direction in the alveolar bone 101 which is generated during use of the teeth, such as chewing action, to reduce the fatigue of the alveolar bone 101. Accordingly, the implant unit 100' according to the embodiment of the present invention prevents damage to the alveolar bone 101 due to fatigue, improves the prognosis of surgery. Further, as the fatigue of the implant unit 100' is reduced, the life span of the unit 100' may be extended.

The stress dispersion member 113 may also protrude from the plate portion 111 at a predetermined angle, similar to the base portion 112. In one embodiment, the stress dispersion member 113 may be inclined downward into the alveolar bone 101 and may be implanted in the alveolar bone 101, as shown by the arrow K. A wider contact area between the alveolar bone 101 and the base 112 may be ensured for the same width because of the inclined downward structure. Thus, the coupling force between the fixing portion 110 'and the alveolar bone 101 may be further improved, and the implant unit 100' may be stably implanted by securing a wide coupling area even in the alveolar bone 101 of a thin thickness.

In addition, when the vertical stress such as a chewing action is generated, the engagement force between the alveolar bone 101 and the implant unit 100' may be further improved because the implanted unit 100', which has been practiced according to the inclined downward structure of the base portion 112, may be implanted deeper.

In one embodiment, the stress dispersion member 113 may be a rectangular, triangular, circular, wedge, or composite structure thereof. For example, it may be a three-dimensional structure plate having a wedge-like structure. The enumeration of the shape of the stress dispersion member 113 is illustrative, and the present invention is not limited thereto.

The stress dispersion member 113 may be disposed at the lower end of the base portion 112. In one embodiment, the stress dispersion member 113 may be disposed at the lowermost end of the plate portion 111. In another embodiment, the stress dispersion member 113 may be disposed between the lowermost end of the plate portion 111 and the base portion 112. Further, in the case of an implant unit for implanting two or more missing teeth, it can be disposed between a plurality of base portions arranged at of the lower side the plurality of abutments. In another embodiment, the stress dispersion member 113 may be disposed between the opening 114 of the plate portion 111 and the engagement hole 115. The arrangement of the stress dispersion member 113 is illustrative, and the present invention is not limited thereto.

In one embodiment, the stress dispersion member 113 may be integrally formed with the plate portion 111. The stress dispersion member 113 is integrally formed with the plate portion 111 to prevent the implant unit from falling off. In another embodiment, when an implanting process of the implanting unit in which the stress dispersion member 113 and the plate portion 111 are integrated is not easily performed, the stress dispersion member 113 may be engaged with the plate portion 111 through the first side surface PL1 and the second side surface PL2. The enumeration of the coupling examples between the stress dispersion member 113 and the plate portion 111 is illustrative, and the present invention is not limited thereto.

FIG. 3A-FIG. 3F are perspective views illustrating implant units 200, 300, 400, 500, 600, and 700 in accordance with various embodiments of the present invention.

Figure 3A:
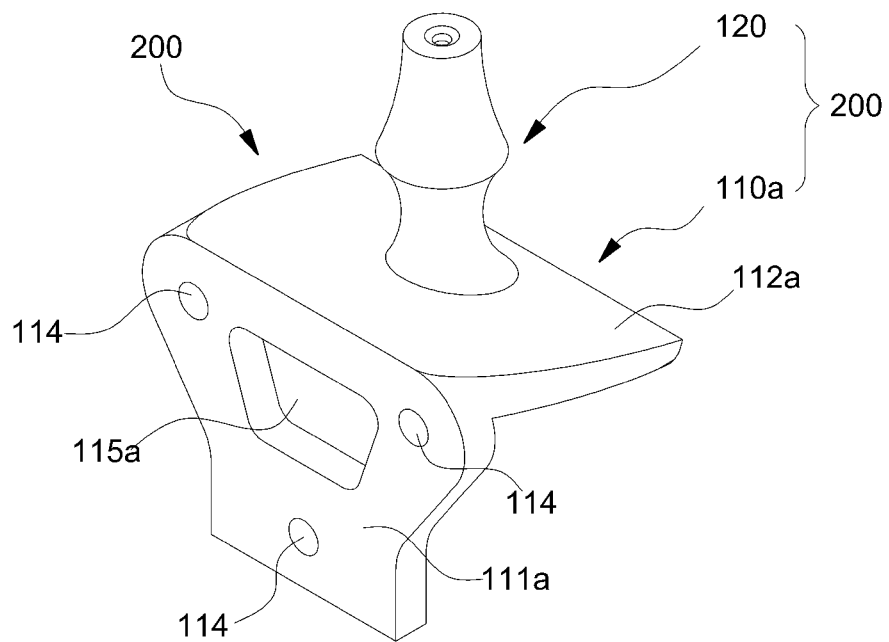
FIGS. 3A-3F are perspective views illustrating implant units in accordance with various embodiments of the present invention.

Referring to FIG. 3A, the fixing portion 110a of the implant unit 200 is directly implanted in the alveolar bone 101, and some implanted portions are exposed to the outside and the portions exposed may be embedded by the gingiva to serve as a support. According to one embodiment, the fixing portion 110a may have a trapezoidal plate portion 111a having a trapezoid in which an upper side is wider than a lower side, and curved corners, and may include the opening 115a and a plurality of engagement holes 114 formed in a trapezoid in which an upper side is wider than a lower side, and curved corners. In addition, it may include a base portion 112a in the form of a downwardly inclined square-shape that is directly implanted into the alveolar bone. The abutment 120 may be disposed between the prosthesis and the fixing portion 110a at the upper end of the base portion 112a.

The implant unit 200 follows the features of the above-described implant units 100 to 100'. The enumeration of the implant unit 200 is illustrative, and the present invention is not limited thereto.

Figure 3B:
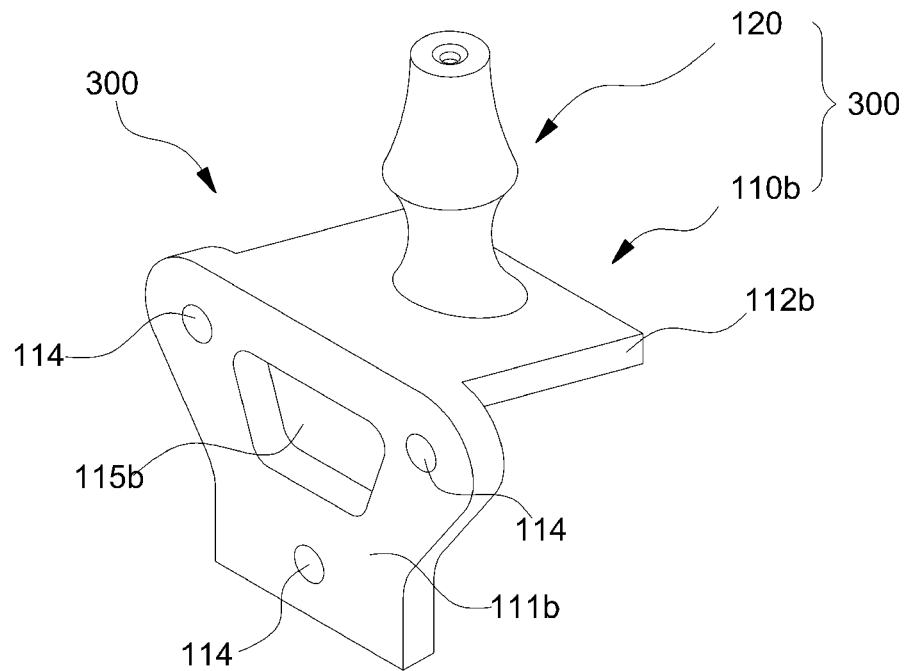

Referring to FIG. 3B, the fixing portion 110b of the implant unit 300 is directly implanted in the alveolar bone 101, and some implanted portions are exposed to the outside and the portions exposed may be embedded by the gingiva to serve as a support. According to one embodiment, the fixing portion 110b may have a trapezoidal plate portion 111b having a trapezoid in which an upper side is wider than a lower side, and curved corners, and may include the opening 115b and a plurality of engagement holes 114 formed in a trapezoid in which an upper side is wider than a lower side, and curved corners. In addition, it may include a base portion 112b in the form of a downwardly inclined square-shape that is directly implanted into the alveolar bone. The abutment 120 may be disposed between the prosthesis and the fixing portion 110b at the upper end of the base portion 112b.

The implant unit 300 follows the features of the above-described implant units 100 to 100'. The enumeration of the implant unit 300 is illustrative, and the present invention is not limited thereto.

Figure 3C:
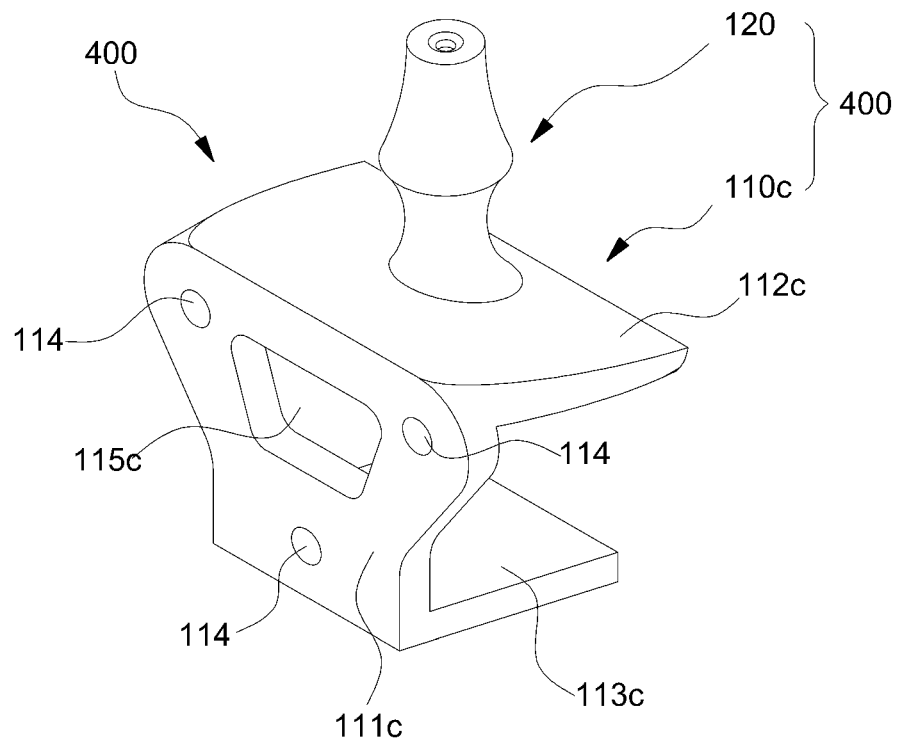

Referring to FIG. 3C, the fixing portion 110c of the implant unit 400 is directly implanted in the alveolar bone 101, and some implanted portions are exposed to the outside and the portions exposed may be embedded by the gingiva 102 to serve as a support. According to one embodiment, the fixing portion 110c may have a trapezoidal plate portion 111c having a trapezoid in which an upper side is wider than a lower side, and curved corners, and may include the opening 115c and a plurality of engagement holes 114 formed in a trapezoid in which an upper side is wider than a lower side, and curved corners. In addition, it may include a base portion 112c in the form of a downwardly inclined wedge-shape that is directly implanted into the alveolar bone. The abutment 120 may be disposed between the prosthesis and the fixing portion 110c at the upper end of the base portion 112c. Further, the implant unit 400 may further include a stress dispersion member 113c at the lowermost end of the plate portion 111c.

The implant unit 400 follows the features of the above-described implant units 100 to 100'. The enumeration of the implant unit 400 is illustrative, and the present invention is not limited thereto.

Figure 3D:
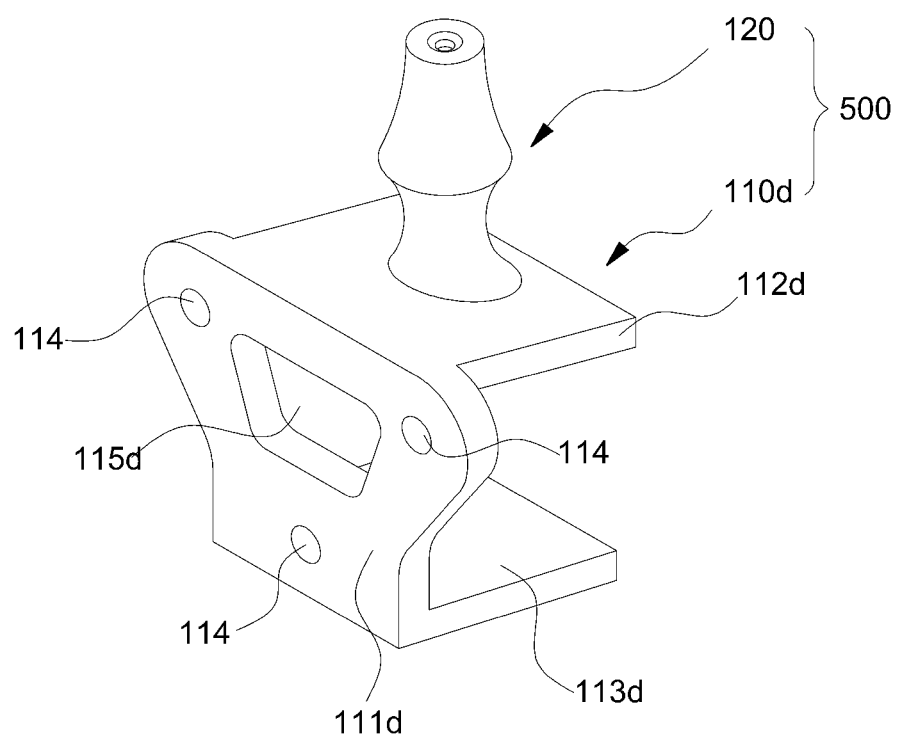

Referring to FIG. 3D, the fixing portion 110d of the implant unit 500 is directly implanted in the alveolar bone 101, and some implanted portions are exposed to the outside and the portions exposed may be embedded by the gingiva 102 to serve as a support. According to one embodiment, the fixing portion 110d may have a trapezoidal plate portion 111c including a trapezoid in which an upper side is wider than a lower side and the corners are curved, and may include the opening 115d and a plurality of engagement holes 114 formed in a trapezoid in which an upper side is wider than a lower side and the corners are curved. In addition, it may include a base portion 112d in the form of a downwardly inclined square-shape that is directly implanted into the alveolar bone. The abutment 120 may be disposed between the prosthesis and the fixing portion 110d at the upper end of the base portion 112d. Further, the implant unit 500 may further include a stress dispersion member 113d at the lowermost end of the plate portion 111d.

The implant unit 500 follows the features of the above-described implant units 100 to 100'. The enumeration of the implant unit 500 is illustrative, and the present invention is not limited thereto.

Figure 3E:
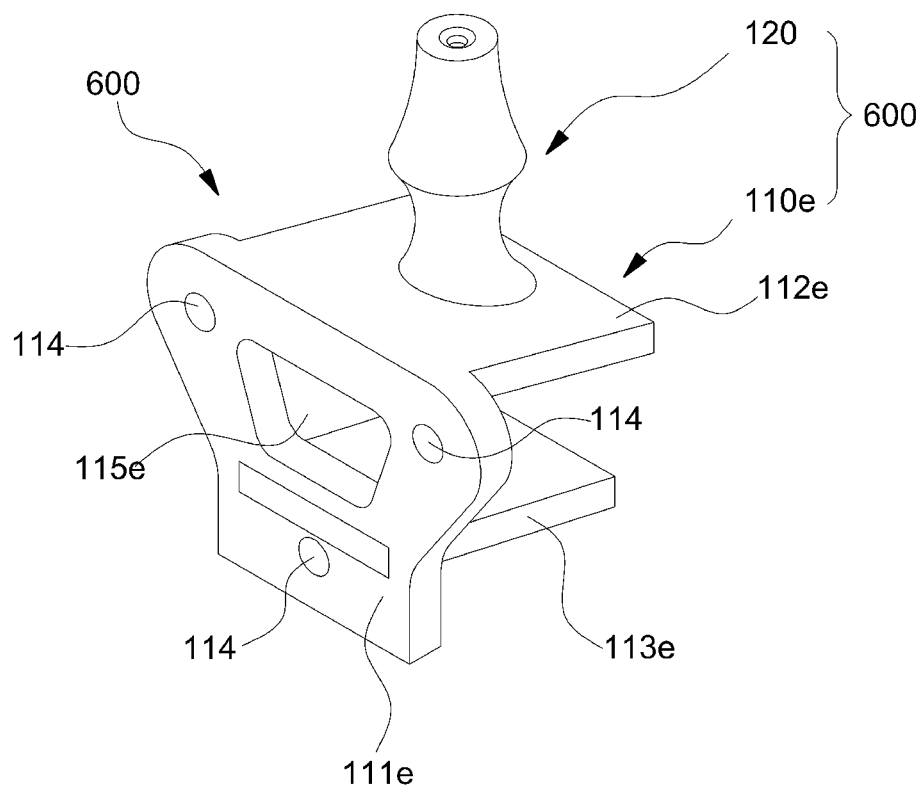

Referring to FIG. 3E, the fixing portion 110e of the implant unit 600 is directly implanted in the alveolar bone 101, and some implanted portions are exposed to the outside and the portions exposed may be embedded by the gingiva to serve as a support. According to one embodiment, the fixing portion 110e may have a trapezoidal plate portion 111e having a trapezoid in which an upper side is wider than a lower side and the corners are curved, and may include the opening 115e and a plurality of engagement holes 114 formed in a trapezoid in which an upper side is wider than a lower side and the corners are curved. In addition, it may include a base portion 112e in the form of a downwardly inclined square-shape that is directly implanted into the alveolar bone. Further, it may further include a stress dispersion member 113e between the opening 115e and the lower end of the plate portion 111e. According to one embodiment, the stress dispersion member 113e may be engaged with the plate portion 111e through the first side surface and the second side surface of the plate portion 111e.

The implant unit 600 follows the features of the above-described implant units 100 to 100'. The enumeration of the implant unit 600 is illustrative, and the present invention is not limited thereto.

Figure 3F:
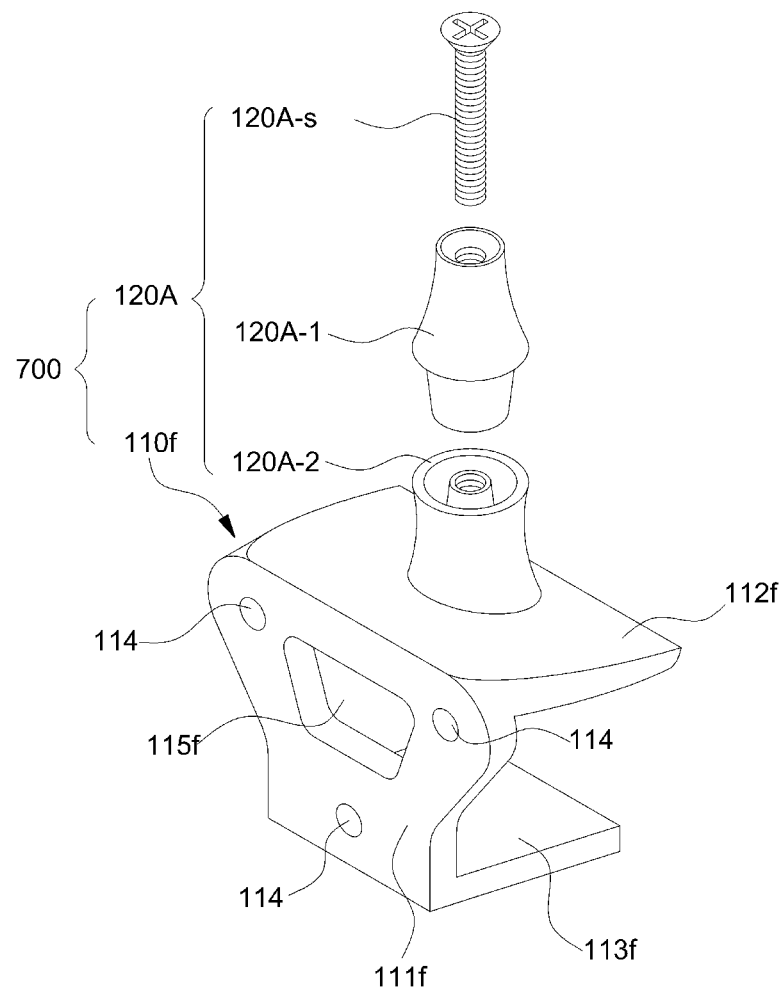

Referring to FIG. 3F, the fixing portion 110f of the implant unit 700 is directly implanted in the alveolar bone 101, and some implanted portions are exposed to the outside and the portions exposed may be embedded by the gingiva 102 to serve as a support. According to one embodiment, the fixing portion 110f may have a trapezoidal plate portion 111f having a trapezoid in which an upper side is wider than a lower side, and curved corners, and may include the opening 115f and a plurality of engagement holes 114 formed in a trapezoid in which an upper side is wider than a lower side, and curved corners. In addition, it may include a base portion 112f in the form of a downwardly inclined wedge-shape that is directly implanted into the alveolar bone.

The abutment 120A may be disposed between the prosthesis and the fixing portion 110f at the upper end of the base portion 112f. The abutment 120A may include coupling holes 120A-h and 120A-h' for connecting the first structure 120A-1 and the second structure 120A-2 to the upper side. In one embodiment, the engagement holes 120A-h and 120A-h' may be coupled by using the engagement members 120A-s, a screw connection or an insertion coupling. Thus, the abutment member 120A may be tightly engaged with the fixing member 110f. The engagement members 120A-s may be formed of a metal such as titanium (Ti), or surgical stainless steel, or an alloying material thereof.

The implant unit 700 may further include a stress dispersion member 113f arranged at the lowermost end of the plate portion 111f. The implant unit 700 follows the features of the above-described implant units 100 to 100'. The enumeration of the implant unit 700 is illustrative, and the present invention is not limited thereto.

Figure 4A:
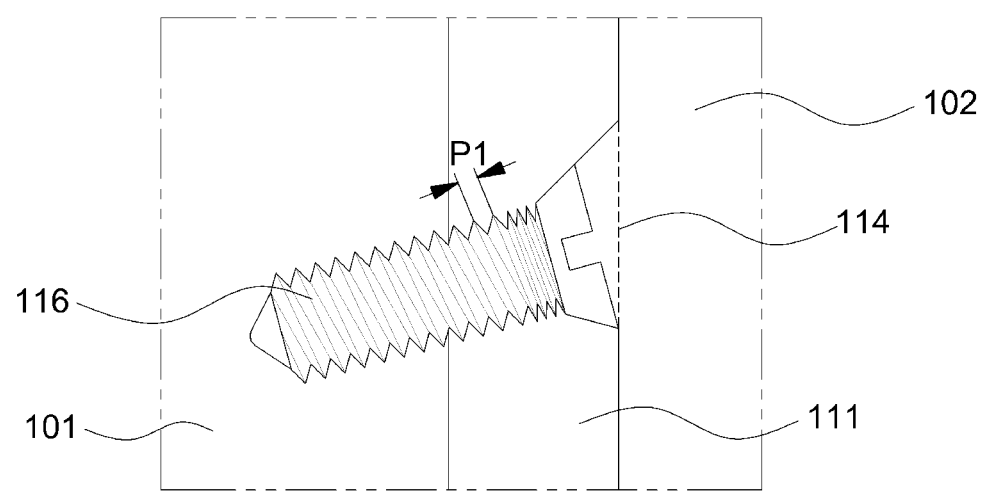
FIG. 4A is a cross-sectional view of an engagement hole and an engagement unit of an artificial dental root illustrated in FIGS. 2A and 2D.
Figure 4B:
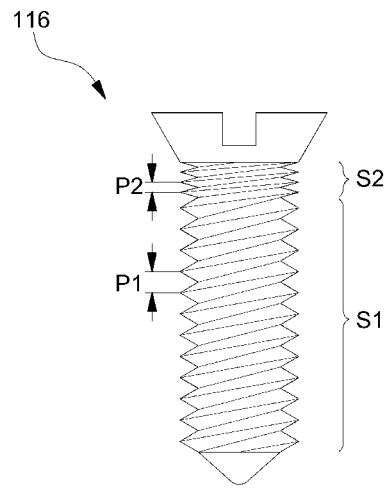
FIG. 4B is an enlarged cross-sectional view of the engagement unit shown in FIG. 4A.

FIG. 4A is a cross-sectional view of an engagement hole 114 and an engagement unit 116 according to an embodiment of the present invention, and FIG. 4B is an enlarged cross-sectional view of the engagement unit 116 shown in FIG. 4A.

Referring to FIG. 4A, the plate portion 111 may include an engagement hole 114. The engagement hole 114 passes through the first side surface and the second side surface of the plate portion 111 and the implant unit may be coupled to the alveolar bone 101 through the engagement hole 114. According to one embodiment, at least more than one engagement hole 114 may be disposed in the plate portion 111 and may have a downwardly inclined inner circumferential surface.

According to the embodiment of the present invention, even in the case of the thin alveolar bone 101 with the downwardly inclined inner circumferential surface structure of the engagement hole 114, as compared with the case where the engagement unit is engaged in the horizontal direction, the coupling length between the plate portion 111 and the alveolar bone 101 may be further improved. The engagement length of the engagement unit 116 passing through the alveolar bone 101 may be increased remarkably.

Referring to FIG. 4B, in one embodiment, the engagement unit 116 may include a main body portion having a first screw thread line S1 of a first pitch P1; and the head portion having a second screw thread line S2 connected to the first screw thread line S1. The second pitch P2 may have a smaller pitch than the first pitch P1.

One to three threads of the second screw thread line S2 having the second pitch P2 may be arranged in the head portion. When the engagement unit 116 is engaged with the alveolar bone 101 through the engagement hole 114, the second screw thread line S2 of the engagement unit 116 having the second pitch P2 is coupled to the pitch P1 of the inner circumferential surface of the engagement hole. Therefore, the engagement unit 116, the engagement hole 114 or both of the engagement unit 116 and the engagement hole 114 are irreversibly distorted and then, may be engaged with the alveolar bone 101 by the different pitches (P1≠P2). This may lead to a strong coupling between the alveolar bone 101 and the fixed portion. Further, a taper structure may be further provided at the upper end of the head portion of the engagement unit, so that the coupling force between the alveolar bone 101 and the fixing portion may be improved.

Figure 5A:
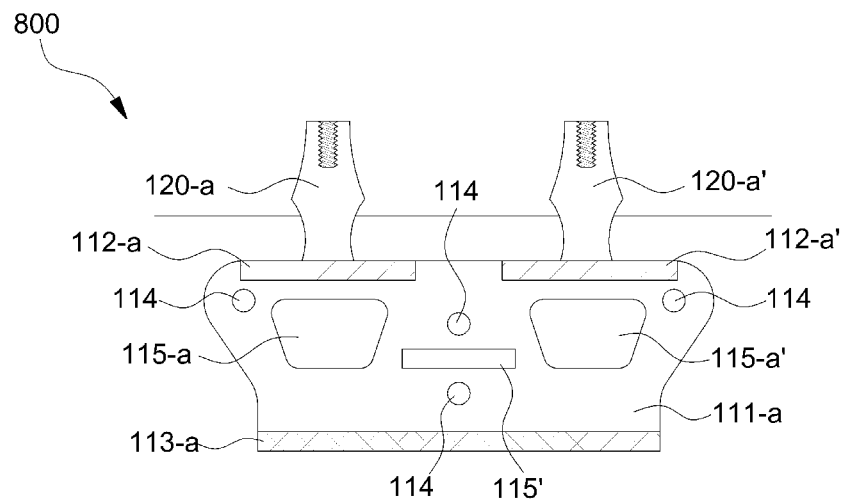
FIG. 5A and FIG. 5B are cross-sectional views illustrating implant units according to other embodiments of the present invention, which constitute a plurality of abutment, respectively.
Figure 5B:
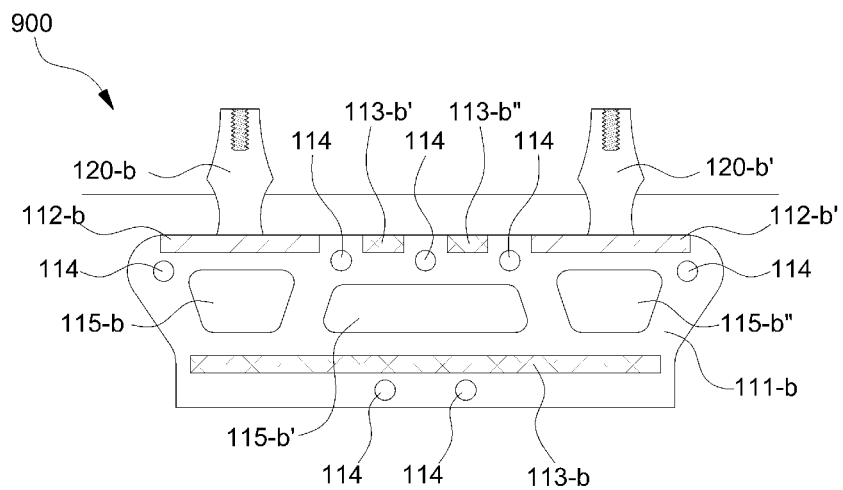

FIG. 5A and FIG. 5B are cross-sectional views illustrating implant units 800, 900 according to other embodiments of the present invention, which constitute a plurality of abutment 120-a, 120-a', 120-b and 120-b', respectively.

Referring to FIG. 4A, the implant unit 800 may be applied to two or more missing teeth. According to one embodiment, the fixing portion 110-a of the implant unit 800 may have a plate portion 111-a of a trapezoid in which the upper side is wider than the lower side and the corners are curved, and may include one or more opening 115-a, 115-a' and an engagement hole 114 formed in a trapezoid in which the upper side is wider than the lower side and the corners are curved. Further, it may further include an opening 115' for relieving the stress between the engagement holes 114.

As described above, the implant unit 800 may include the downwardly inclined base portion 112-a, 112-a', and a plurality of abutment 120-a and 120-a' arranged on the upper portion of the base portion 112-a and the upper portion of the base portion 112-a' for connecting the prosthesis and the fixing portion 110-a. Further, it may further include a stress dispersion member 113-a. The stress dispersion member 113-a may be integrally formed with the plate portion 111-a and may be assembled with the plate portion 111-a and to be engaged with it.

The implant unit 800 follows the features of the above-described implant units 100 to 100'. The enumeration of the implant unit 800 is illustrative, and the present invention is not limited thereto.

Referring to FIG. 5B, the implant unit 900 may be applied to two or more missing teeth having a large distance between them or having a large size. According to one embodiment, the fixing portion 110-b of the implant unit 900 may have a plate portion 111-b of a trapezoid in which the upper side is wider than the lower side and the corners are curved, and may include more than one opening 115-b, 115-b', 115-b", and a plurality of engagement holes 114 of a trapezoid in which the upper side is wider than the lower side and the corners are curved.

As described above, the implant unit 900 may include the downwardly inclined base portion 112-b, 112-b', and a plurality of abutment 120-b and 120-b' for connecting the prosthesis and the fixing portion 110-a arranged on the upper portion of the base portion 112-b, 112-b'. Further, it may further include a stress dispersion member 113-b, 113-b', 113-b". The stress dispersion member 113-b, 113-b'. 113-b" may be integrally formed with the plate portion 111-b and may be assembled with the plate portion 111-b and to be engaged with it.

The implant unit 900 follows the features of the above-described implant units 100 to 100'. The enumeration of the implant unit 900 is illustrative, and the present invention is not limited thereto.

According to an embodiment of the present invention, there is provided an implant unit comprising a fixing portion including a plate portion having a first side surface and a second side surface extending along the horizontal extending direction of the alveolar bone and opposed to each other, and a base portion protruding from the first side surface at an upper end of the plate portion, penetrating through the surface of the alveolar bone and being implanted into the alveolar bone; and at least more than one abutment formed on the upper end of the base portion. Therefore, the implant unit may be provided even when the alveolar bone is thin or short as compared with the conventional vertical penetrating implant unit, when the alveolar bone is excessively absorbed, and when the alveolar bone is damaged.

In addition, the stress transmitted to the alveolar bone caused by the chewing action is dispersed due to the base portion protruding from the plate portion and implanted into the alveolar bone, thereby reducing the fatigue of the alveolar bone and preventing damage to the alveolar bone. As a result of the dispersion of the stress, the implant unit in which fatigue received by the alveolar bone is reduced and a life span of the implant unit is prolonged may be provided.

According to the above-described various embodiments, the present invention has an advantage that the damage of the alveolar bone may be reduced, and the life of the implant unit may be prolonged, as compared with the conventional implant unit using a method vertically penetrating through alveolar bone.

In addition, there is an advantage that even when the alveolar bone is innately short or very thin; the alveolar bone is excessively absorbed due to the use of the provided implant unit or aging; or the alveolar bone is damaged after the teeth are removed and are neglected without any care for a long time; and the gum disease is severely aggravated and thus, the alveolar bone is severely damaged, it is possible to provide an implant unit which may be operated or re-operated.

The present invention described in the foregoing paragraphs is not limited to the above-described embodiments and the accompanying drawings. It will be apparent to the person skilled in the art having a common knowledge that various replacements, modifications and variations may be made in the present invention without departing from the spirit or scope of the inventions.

The invention claimed is:

1. An implant unit comprising;
   an artificial dental root including a plate portion having a first side surface and a second side surface which are configured to be extended along the horizontal extending direction of the alveolar bone and opposed to each other, and a base portion protruding from the first side surface at an upper end of the plate portion when assuming that the plate portion is arranged in a substantial vertical direction, the base portion being configured to penetrate through a surface of the alveolar bone and adapted to being implanted into the alveolar bone, and base portion being provided to be inclined downward with respect to a horizontal plane to form an acute angle with the plate portion; and
   at least more than one abutment formed on an upper end of the base portion when assuming that the base portion is protruded in a side direction at the upper end of the plate portion.

2. The implant unit of claim 1, wherein at least a part of the first side surface of the plate portion is configured to be implanted in the alveolar bone, and at least a part of the second side surface is configured to be exposed to the outside of the alveolar bone.

3. The implant unit of claim 2, wherein the part of the second side surface, which is configured to be exposed to the outside of the alveolar bone, is configured to be covered by the gingiva.

4. The implant unit of claim 1, wherein an average length L of the first side surface and the second side surface of the plate portion satisfies a relationship concerning the thickness W of the fixing portion, that is, $2 \leq L/W \leq 100$.

5. The implant unit of claim 1, wherein the plate portion includes at least more than one engagement hole passing through the first side surface and the second side surface, and an engagement unit for engaging the alveolar bone with the engagement portion through the at least one engagement hole is coupled to it.

6. The implant unit of claim 5, wherein the at least more than one engagement hole has an inclined inner peripheral surface, the inclined inner peripheral surface being configured to be inclined downwardly with respect to the alveolar bone.

7. The implant unit of claim 6, wherein the engagement unit is a screw, and the screw has a main body portion having a first screw thread line of a first pitch; and a head portion having a second screw thread line having a second pitch different from the first pitch and connected to the first screw thread line.

8. The implant unit of claim 5, wherein the engagement unit is a screw, and the screw has a main body portion having a first screw thread line of a first pitch; and a head portion having a second screw thread line having a second pitch different from the first pitch and connected to the first screw thread line.

9. The implant unit of claim 8, wherein the second pitch is smaller than the first pitch.

10. The implant unit of claim 1, wherein the plate portion includes at least more than one opening which penetrates the first side surface and the second side surface to expose internal tissue of the alveolar bone.

11. The implant unit of claim 10, wherein an aperture ratio of the at least more than one opening is in a range of 5% to 95% of an area of the plate portion.

12. The implant unit of claim 1, wherein the base portion protrudes from the first side surface of the plate portion and is configured to be inclined downwardly into the alveolar bone.

13. The implant unit of claim 1, wherein the base portion has a rectangular structure, a triangular structure, a circular structure, a wedge-shaped structure, or a composite structure thereof.

14. The implant unit of claim 1, wherein the plate portion and the base portion define a fixing portion, and the at least more than one abutment is integrally formed with the fixing portion.

15. The implant unit of claim 1, wherein the plate portion and the base portion define a fixing portion, the at least more than one abutment is engaged to an upper end of the fixing portion.

16. The implant unit of claim 1, further comprising a stress dispersion member protruding from the first side surface of the plate portion, the stress dispersion member being disposed to be apart from the base portion, configured to pass through the surface of the alveolar bone, and adapted to being implanted into the alveolar bone in a downward inclination manner with respect to the horizontal plane.

17. The implant unit of claim 16, wherein the stress dispersion member is disposed at a lower end of the plate portion which is opposite to the upper end thereof, or an area between the upper end and the lower end of the plate portion.

18. The implant unit of claim 16, wherein the stress dispersion member is integrally formed with the plate portion.

19. The implant unit of claim 16, wherein the stress dispersion member is engaged with the plate portion through the first side surface and the second side surface of the plate portion.

20. The implant unit of claim 16, wherein the stress dispersion member has a square structure, a triangular structure, a circular structure, a wedge-shaped structure, or a composite structure thereof.

21. An implant unit comprising;
   an artificial dental root including a plate portion having a first side surface and a second side surface which are configured to be extended along the horizontal extending direction of the alveolar bone and opposed to each other, and a base portion protruding from the first side surface at an upper end of the plate portion when assuming that the plate portion is arranged in a substantial vertical direction, the base portion being configured to penetrate through a surface of the alveolar bone and adapted to being implanted into the alveolar bone;
   at least more than one abutment formed on an upper end of the base portion when assuming that the base portion is protruded in a side direction at the upper end of the plate portion; and
   a stress dispersion member protruding from the first side surface of the plate portion, the stress dispersion member being disposed to be apart from the base portion, configured to pass through the surface of the alveolar bone, and adapted to being implanted into the alveolar bone in a downward inclination manner with respect to a horizontal plane.

* * * * *